United States Patent [19]
Magaldi

[11] 3,749,228
[45] July 31, 1973

[54] PROTECTED BELT CONVEYOR
[76] Inventor: Paolo Magaldi, Via Irno 505, Salerno, Italy
[22] Filed: June 14, 1972
[21] Appl. No.: 262,709

[52] U.S. Cl. ............................. 198/140, 198/149
[51] Int. Cl. .......................................... B65g 17/12
[58] Field of Search ................... 198/189, 198, 149, 198/140, 151, 152

[56] References Cited
UNITED STATES PATENTS

| | | | |
|---|---|---|---|
| 329,862 | 11/1885 | Stephens | 198/140 |
| 2,987,165 | 6/1961 | Sheehan | 198/149 |
| 3,055,488 | 9/1962 | Stone | 198/198 |

*Primary Examiner*—Richard E. Aegerter
*Attorney*—Roland T. Bryan et al.

[57] ABSTRACT

A conveyor system having a protected belt driving element on which are mounted a plurality of load bearing elements which compliment one another to provide a protective surface shielding the driving element from conveyed material. The load bearing elements are mounted on the driving element in a spaced manner to essentially insulate the driving element from physical and thermal contact with the conveyed material. Hot loose materials and abrasives may advantageously be transported on this conveyor system which is readily adaptable to existing conveyors.

7 Claims, 7 Drawing Figures

PATENTED JUL 31 1973 3,749,228
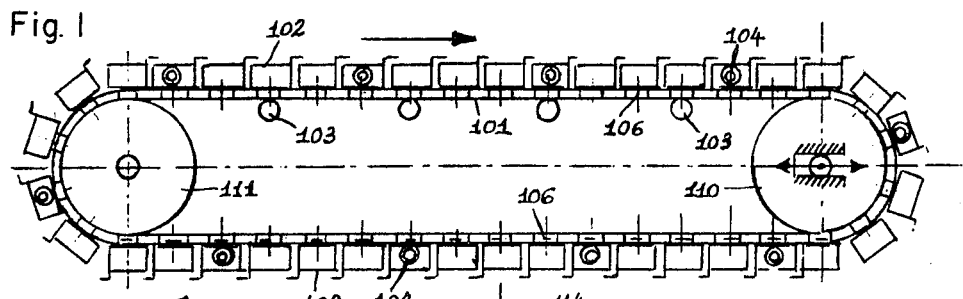
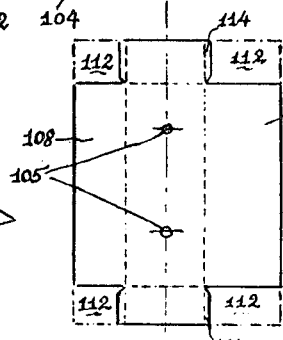
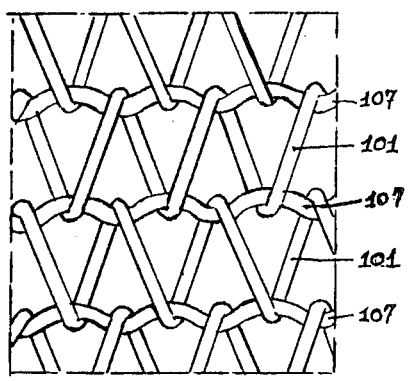
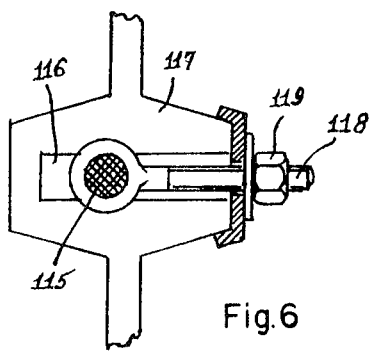

PROTECTED BELT CONVEYOR

BACKGROUND OF THE INVENTION

1. Field Of The Invention

This invention relates to a protected conveyor for transporting material and more particularly, to a conveyor for carrying loose material at high temperatures without deleterious effect on the protected belt of the conveyor. Through its capability of handling relatively hot materials the conveyor of the present invention is particularly adapted for use in conveying slag or other waste materials encountered in foundaries, hot clinkers of ash and the like from furnaces, coke, hot casting sand and similar loose material which may be at a high temperature. The transportation of hot materials, not in a loose state, such as cast sheets and the like, may also be suitably accomplished by the protected conveyor of this invention as may the conveyance of abrasives and the like.

2. Description Of The Prior Art

Known conveyors for carrying loose material at high temperatures include conveyor belts consisting of steel plates anchored at the two sides of a chain which forms a driving element. The steel plates often have upstanding sides and partially overlap one another so as to form a channel to hold the material. The chain is driven by sprocket connected to the reduction unit of a motor and is supported by being wound on a spool of a return drum. The sides of each plate contain wheels adapted to bear on two runways arranged at both sides of the channel conveyor support frame. An example of such a conveyor is seen in U.S. Pat. No. 1,112,948.

The foregoing type of conveyor, in addition to possessing drawbacks associated with high installation costs for the chain and metal plate lengths and widths normally required in a plant, does not provide satisfactory performance for several reasons. Since the chain driving element is rigidly connected to an integral part of the driven element consisting of the plates the expansions and contractions of the plates occurring due to the heat of the high temperature material falling on the conveyor are transferred to the chain. Thus, as the material passes from a loading area to an unloading area, undergoing cooling therebetween, the expansions and contractions cause vibrations which in turn result in spillage and loss of material along the way. This loss of material along the conveyor path not only disturbs and interrupts the work of personnel, presenting a safety hazard around the conveyor, but causes damage to machinery installed in the plant, especially to rotating parts thereof. Because the chain driving element requires frequent replacement, the conveyor requires essentially continuous maintenance to minimize dangerous consequences which often attend breakage of the chain, and to assure continuous performance of the apparatus.

Others have suggested utilizing metallic belts of the mesh type as conveyors for handling hot material. However, these prior art belts are similarly disadvantageous since the mesh itself often acts as the material holding element and thus is subjected to the deleterious thermal and corrosive effects of the material. Additionally, they possess the same disadvantage as the steel plate conveyors in that the material carrying elements either function as the driving element or has large contact area with the driving element, thus subjecting it to thermal deformations resulting from the temperature of the conveyed material.

SUMMARY OF THE INVENTION

The present invention overcomes the disadvantages associated with the prior art conveyors by providing a conveyor having a protected belt or driving element which does not experience the deleterious thermal effects of the conveyed material. This is accomplished by mounting a plurality of material carrying elements on a flexible steel wire link net driving element with a minimum of contact therebetween. The material carrying elements are arranged so as to present an essentially continuous surface protecting the driving element from any contact whatsoever with the conveyed material, either due to falling thereon or otherwise. This flexible wire link net endless belt driving element is actuated by normal steel drums having a sufficiently high coefficient of friction, so that the conveyor of the present invention may be readily adapted to already existing conveyor with a minimum of effort and expenditure.

It is an object of this invention to provide a conveyor capable of transporting high temperature loose material without experiencing deleterious effects due to the thermal effects resulting from the temperature of the conveyed material.

A further object of this invention is the provision of a conveyor having a protected driving element which is maintained free from physical contact or appreciable thermal contact with material being conveyed and which possesses a long operating life and is not subjected to frequent breakdowns.

A further object of the present invention is to provide a conveyor overcoming the known disadvantages associated with the conveyance of hot loose material yet which may be readily adapted to existing conveyor frame and driving system with little or no change of elements and with a minimum of cost.

In my U.S. Pat. No. 3,633,737 titled "Conveyor, Particularly For Hot Materials," I disclosed an efficient and inexpensive conveyor requiring little maintenance and capable of carrying hot materials.

The present invention provides a yet improved conveyor for conveying hot materials having the following elements: A steel wire link net driving element, driving and supporting drums, a plurality of suitably shaped load bearing metal boxes anchored to the net, an iron frame supporting the conveyor elements, a plurality of bearing rollers for the forward run of the net, wheels mounted on the sides of some boxes at regularly spaced intervals which, during the return run of the belt, move on runways or tracks so as to support the conveyor belt. The boxes are anchored to the net by means of pins passing through their bottom and fixed crossed plates inserted in the net links so as to provide a minimum of contact between the box and the net driving element.

BRIEF DESCRIPTION OF THE DRAWINGS

The features of each element of the conveyor according to the present invention will be best understood with reference to a preferred embodiment of the conveyor which will be described in detail in conjunction with the accompanying drawings, in which:

FIG. 1 is a diagrammatic side elevational view of a conveyor belt system according to the present invention;

FIG. 2 is a plan view of a portion of a conveyor driving net;

FIG. 3 is a perspective view of a box forming the load bearing elements of the conveyor system;

FIG. 4 is a plan view of a plate band prepared for making a box as shown in FIG. 3;

FIG. 5 is a sectional front view showing the structure of one coil of the driving net and the manner of anchoring the load bearing elements thereto;

FIG. 6 is a schematic view of a detail of a device for adjusting the tension of the conveyor driving element and;

FIG. 7 is a perspective view of a portion of the conveyor system including the frame upon which the various elements are mounted.

DESCRIPTION OF THE PREFERRED EMBODIMENTS

A schematic side view of the conveyor belt system showing its direction of travel indicated by the arrows is illustrated in FIG. 1. The net 101 is the driving element of the system and consists of an endless belt passing about the driving drum 110 and the return drum 111. The driving drum 110 is preferably provided with means for adjusting its position so as to maintain the net driving element under the proper tension at all times.

With reference to FIGS. 1 and 7 it is seen that the net driving element 101 is supported in its forward run, in the direction of the upper arrow, shown in the drawing as a forward run moving to the right, by a plurality of spaced-apart rollers 103. As particularly shown in FIG. 7, the driving and return drums 110 and 111 and the rollers 103 are suitably connected to an iron frame for supporting the conveyor system. The iron frame is made of L and C frame profiles appropriately joined with another by welding so as to form a rigid structure. Alternatively, the L and C frame profiles may be replaced by rectangular pipes, such as shown as 120, so as to provide a lighter frame in its entirety without sacrifice of structural properties of stiffness and sturdiness.

The lateral walls of the frame may be formed from a plate, the two edges of which are bent to form a C girder. With such C girders, crossbars are fixed on the upper portion for supporting the rollers 103 for the belt while two lower girders form tracks or guide runways, the purpose of which will be described in more detail below.

The rollers 103 for supporting the belt 101 in the forward run, shown in FIG. 1 and 7, are arranged beneath the belt by suitable supports appropriately secured to the frame. The rollers rotate on bearings sealed for protection from dust with a labyrinth seal which permits lubrication at regular time intervals through means of a shaft. Roller spacing varies according to the width of the belt, the transport capacity per hour, the material fall height and generally the degree of difficulty of the conditions of transportation.

Referring to FIGS. 1 and 7, selected boxes 102 are shown with wheels 104 mounted on bearings and fixed to the sides of the boxes. The wheels 104 are engaged in the two guide tracks or runways 121 arranged at the two lower sides on the frame and are the belt support in the return run. The distance of each pair of wheels from the adjacent one is a function of the belt width and the weight of the boxes mounted. In order to avoid accumulation of material which may possibly fall on the revolving surface of the wheels, a convex crown surface is given to them so that dust slides therefrom and is not transferred from the wheels to the runways. This avoids build-up and compression of dirt in a non-uniform way as to cause vibrations leading to rapid wear of the runways.

As shown in FIGS. 1, 3 and 7, the load bearing boxes 102 have two walls, transverse to the direction of movement, with shape and size different from one another. The rear or upstream wall 108 is substantially straight and smaller than the front or downstream wall 109 which has its upper edge bent so as to overlap the rear wall of the preceding box. Thus, this complementary relationship of the boxes results in their presenting what may be termed a substantially continuous protective surface to the material being fed thereon, by a loading trough or the like, with the result that no material can fall between two adjacent boxes.

The boxes may be made from several materials depending on the nature of the substance to be carried. For conveying hot and abrasive materials, metal boxes are preferred, while for carrying cold and not very abrasive material, boxes may be made from thermoplastic materials such as polystyrene, polyamide, polycarbonate and the like, with or without fiberglass reinforcement, and molded by known methods.

A method of fabricating suitable metal boxes is illustrated by FIG. 4. Excess portions 112 are removed from a sheet or plate and through the use of dies and mechanical presses the portions forming the transverse and side walls are bent into position to obtain a box. With the provision of edges 114 at the corners a rigid box is obtained with subsequent spot welding, or, alternatively, welded with arc or autogenous welders with or without material bead. Other methods of fabrication may be used and, for example, the box may be obtained from deep drawing of a steel plate. By using a drawing die in a suitable press, a drawn box of the desired shape with the required bends is obtained. If the box is required to be of a thickness of several millimeters, it is preferably made of die cast steel.

The configuration of the load bearing boxes may be varied according to the specific use to which the conveyor is put. Thus, when plant installation requires that the conveyor be inclined the rear and front walls of the boxes, in the direction of movement, may also be inclined to the horizontal and have a height which allows a very high material transport capacity per hour. The height to be given to the boxes, once the width of the belt has been chosen, is a function of the transport capacity per hour and of the specific gravity of the material to be carried.

An advantage of these load bearing boxes and the conveyor of this invention is that they may be used with already existing conveyor installations and if the reduction unit of the existing motor does not permit further increase in driving belt speed the transport capacity can be increased by simply replacing boxes with others of greater height. It is advisable not to fill the boxes to a level in excess of two-thirds of their height in order to avoid spilling of material. If a greater capacity is required, belt speed should preferably be increased rather than increasing box loading.

Other configurations of load bearing units may be utilized. Thus, the two transverse walls of the boxes may be removed to obtain load bearing units in the shape of partially overlapped tiles or plates having upstanding side walls which form a general continuous channel bed conveyor particularly suitable for highly abrasive material instead of a batch conveyor with independent boxes. The plates may abut one another instead of overlapping. Thus, a substantially continuous protective surface is provided. The connection of such plate elements to the net driving element is the same as with the boxes. A continuous moving plane or flat bed can be utilized in those cases where little or no risk of loss of material is present. Such is also highly suitable when the material is heavy. In this instance overlapping or abutting simple plates or blades are sufficient. Since the driving element is steel, the possibility of placing blades of considerable weight and thickness therein does not create problems and permits transportation of heavy loads, high temperature loads and loads fed by falling from a height.

A detailed view of the driving element of the system, the flexible net 101, is seen in FIG. 2 showing it to consist of flattened coils made of high resistance steel wire. The helices alternate right and left and are connected with one another by means of the undulated connecting pins 107, also fabricated of special steel but with a cross-section greater than that of the flattened coils. A suitable undulation is given to the connecting pins 107 so as to laterally offset the coils from one another in order to obtain a gap between the wires of two adjacent coils. In this way two adjacent coils are freely hinged witth one another and may smoothly flex and slide on the driving roller 110 and the idle rollers 111 seen in FIG. 1. Alternatively, the coils may be simply interlaced with one another without intermediate pins in which instance the coils are all oriented in the same direction.

The characteristics of the net 101 may vary according to the nature of use of the conveyor. Particularly, the following parameters may be modified: Thickness of the net wire; pitch and inclination of the coil; height and length of the coil; and cross-section of the pins connecting the coils. Where the conveyor is to carry cold and not highly abrasive material the driving element belt 101 may be made of rubberized cloth.

A cross-sectional view of the endless flexible wire link net 101 is shown in FIG. 5 which also illustrates the manner in which the boxes 102 are anchored to the net. The wire net helical flattened coils or links 107 have inserted therein a cross plate 106. Referring to both FIGS. 4 and 5 there are shown two or more pins 105 passing through the load bearing element, the boxes 102, and fixed to the cross plate 106. The pins 105 may be screwed, riveted or fixed to the cross plate 106 or fastened by any other suitable manner, as, for example, by means of explosion bolts. It can be seen that this system of anchoring the load bearing element 102 to the driving element 101 provides only a minimum of contact between the two. Therefore, very little heat is transferred from the high temperature material conveyed to the net 101 and consequently almost none to the supporting rollers 103 and the driving and return drums 110 and 111.

In operation, the driving element wire belt 101 is wound on the driving drum 110 and on the return drum 111. The driving drum may be of normal steel because the coefficient of friction between the steel surface of the drum 110 and the steel of the driving element 101 is more than sufficient for insuring operation even under high loads for manufacturing plants where the conveyor is of normal length and size. To insure that the proper traction is transmitted a suitable device for holding the driving drum 110 under tension is provided as shown in FIG. 6. Referring to FIG. 6, the axle 115 of the drum may be moved along a slot 116 of the support 117 by means of a threaded tie rod 118 acting on the nut 119. For conveyors of considerable length it is necessary to adjust this device to give considerable traction tension to the net for avoiding slipping on the driving roll or durm.

When plant operations require the use of conveyors of considerable length, slipping on the driving roll may be avoided by other methods of providing considerable traction to the net. Thus, the use of drums of extremely large diameters may be avoided and good contact surface may be insured by replacing the steel drum with a drum of steel covered with leather, alternatively, a drum made entirely of leather and consisting of a plurality of parallel leather discs held together by two lateral plates connected through pins.

Through the use of such leather drums, even of a diameter smaller than usual for steel drums it is possible to actuate the conveyor of the present invention, even though extremely long centered distances and exceptional slopes are present. A leather drum is also useful where the diameter of a normal steel drum proves too cumbersome. The high coefficient of friction for leather actually permits the use of driving drums having smaller diameters and lower costs and allows considerable increase of the conveyor carrying capacity.

The conveyor system of the present invention is readily usable on an existing conveyor such as a rubber belt conveyor which may then be transformed into a protected belt conveyor suitable for carrying hot materials. Otherwise the temperature effects would reduce the life of the rubberized cloth belt to a few days. Thus, the conveyor belt of the present invention, having a metal net or rubberized cloth traveling element and boxes of steel or plastic fixed thereto, may be mounted on the frame of the already existing conveyor and wholely utilize its driving system including the driving and return drums and tension adjusting system. If the present conveyor system has bearing or supporting rollers on its lower or return run they may be replaced by the addition of flat irons along the interside of the frame which will be used as a bearing plane or guide runway for the wheels 104 of the boxes 102.

Due to the unique construction of the protected conveyor, it has been found possible to carry materials at temperatures above 800° C. while the net temperature remains only slightly above room temperature. This is believed to be due to the box dissipating the greater portion of the heat. Any little heat remaining and transferred to the net is easily dissipated through its large specific surface area. Moreover, the use of a net or mesh permits the circulation of air therebetween.

Thus, there has been provided, according to this invention, a conveyor having a protected driving element belt and being well suited for carrying high temperature loose material while possessing a long operation life and reduced conveyor down time with resultant savings in man hours and machinery.

I claim:
1. A conveyor system comprising:
a frame having thereon a guide track means;
an endless flexible wire link net driving element;

driving means mounted on said frame for transmitting force to said driving element;

a plurality of load bearing elements spacedly anchored to said driving element so as to provide a minimum of contact therebetween;

said load bearing elements being formed and anchored in such complementary relationship to one another so as to present an essentially continuous surface during forward run of the driving element which prevents material loaded therein from coming in contact with the driving element;

first support means mounted on at least a portion of said load bearing elements capable of engaging said guide track means second supporting means for supporting said driving element including at least one support element suitably mounted on said frame beneath said driving element for supporting the driving element in a forward run;

and said guide track means mounted on said frame for engagingly receiving said first support means mounted on said load bearing elements during the return run of said driving element.

2. A conveyor system as claimed in claim 1 wherein the load bearing elements are anchored to the driving element by means of pins passing through the load bearing element and secured to cross plates inserted in the net links.

3. A conveyor system as claimed in claim 2 wherein at least a portion of the load bearing elements comprise boxes including two essentially upright walls transverse to the direction of movement of different shape and size, the upstream wall of the box being substantially straight and of less height than the downstream wall of the box which has its upper edge bent so as to overlap the shorter upstream wall of the preceding box, so that material being loaded in the boxes cannot pass between adjacent boxes.

4. A conveyor system as claimed in claim 3 wherein the endless flexible link net driving element comprises flattened coils of high resistance wire having alternating right and left helices connected to one another by means of undulated pins passing therethrough so as to laterally offset the coils from one another permitting them to freely hinge.

5. A conveyor system as claimed in claim 1 wherein the support element for supporting the driving element in a forward run is a rotatable roller and the support means mounted on the load bearing elements are rotatable wheels.

6. A conveyor system as claimed in claim 3 wherein the endless flexible link net driving element comprises flattened coils with helices oriented in the same direction and interlaced with one another.

7. A conveyor system as claimed in claim 4 wherein the driving means is a power driven rotating drum in contact with the driving element having a surface of leather for imparting tractive force to the driving element.

* * * * *